United States Patent
Stefani et al.

(10) Patent No.: US 8,397,853 B2
(45) Date of Patent: Mar. 19, 2013

(54) METHOD OF ARRANGING AN ELECTRIC ACCUMULATING SYSTEM CLOSE TO A PLATFORM OF A VEHICLE AND HYBRID PROPULSION VEHICLE

(75) Inventors: Giovanni Stefani, Cadiroggio (IT); Franco Cimatti, Pavullo (IT); Fabrizio Favaretto, Via Gobetti (IT)

(73) Assignee: Ferrari S.p.A. (IT)

( * ) Notice: Subject to any disclaimer, the term of this patent is extended or adjusted under 35 U.S.C. 154(b) by 629 days.

(21) Appl. No.: 12/653,799

(22) Filed: Dec. 18, 2009

(65) Prior Publication Data

US 2010/0163322 A1 Jul. 1, 2010

(30) Foreign Application Priority Data

Dec. 18, 2008 (IT) .............................. BO2008A0760
Jan. 16, 2009 (IT) .............................. BO2009A0015

(51) Int. Cl.
*B60K 1/04* (2006.01)
(52) U.S. Cl. .................................... 180/68.5; 180/65.31
(58) Field of Classification Search ................. 180/68.5, 180/65.1, 65.31
See application file for complete search history.

(56) References Cited

U.S. PATENT DOCUMENTS

| | | | | |
|---|---|---|---|---|
| 4,334,819 A | | 6/1982 | Hammerslag | |
| 5,392,873 A | * | 2/1995 | Masuyama et al. | 180/68.5 |
| 5,501,289 A | * | 3/1996 | Nishikawa et al. | 180/68.5 |
| 5,558,949 A | | 9/1996 | Iwatsuki et al. | |
| 5,585,205 A | * | 12/1996 | Kohchi | 429/99 |
| 5,833,023 A | | 11/1998 | Shimizu | |
| 6,085,854 A | * | 7/2000 | Nishikawa | 180/68.5 |
| 6,315,069 B1 | * | 11/2001 | Suba et al. | 180/68.5 |
| 6,598,691 B2 | * | 7/2003 | Mita et al. | 180/65.1 |
| 6,978,855 B2 | * | 12/2005 | Kubota et al. | 429/442 |
| 7,079,379 B2 | * | 7/2006 | Yamaguchi et al. | 361/676 |
| 7,353,900 B2 | * | 4/2008 | Abe et al. | 180/68.5 |
| 7,610,978 B2 | * | 11/2009 | Takasaki et al. | 180/68.5 |

(Continued)

FOREIGN PATENT DOCUMENTS

| | | |
|---|---|---|
| DE | 4336931 A1 | 5/1995 |
| DE | 19708404 A1 | 10/1997 |

(Continued)

OTHER PUBLICATIONS

"Euiropean Application Serial No. EP 09179787.8, European Search Report dated Sep. 2, 2010", 4 pgs.

(Continued)

*Primary Examiner* — Jeffrey J Restifo
(74) *Attorney, Agent, or Firm* — Schwegman, Lundberg & Woessner, P.A.

(57) ABSTRACT

A method for arranging an accumulating device in proximity of a floor of a vehicle forming a bottom wall of a passenger compartment of the vehicle itself; the accumulating device has a heating base wall which is free from heat insulation, and a non-heating base wall which is parallel and opposite to the heating base wall and is provided with a heat-insulating material layer; and the method provides for the steps of arranging the accumulating device in a seating obtained in proximity of the floor; and implementing the accumulating device with a symmetry allowing the reversal of the accumulating device itself within the seating obtained in proximity of the floor in such a way that the heating base wall may be equally either facing upwards and then towards the passenger compartment or facing downwards and then towards the external environment.

14 Claims, 10 Drawing Sheets

U.S. PATENT DOCUMENTS

| | | | |
|---|---|---|---|
| 7,997,368 B2 * | 8/2011 | Takasaki et al. | 180/68.5 |
| 8,006,793 B2 * | 8/2011 | Heichal et al. | 180/68.5 |
| 8,016,063 B2 * | 9/2011 | Tsuchiya | 180/68.5 |
| 8,042,637 B2 * | 10/2011 | Nagata et al. | 180/68.5 |
| 2005/0011692 A1 | 1/2005 | Takahashi et al. | |
| 2005/0274556 A1 * | 12/2005 | Chaney | 180/68.5 |
| 2006/0060402 A1 * | 3/2006 | Abe et al. | 180/68.5 |
| 2007/0128507 A1 | 6/2007 | Watanabe et al. | |
| 2010/0071980 A1 * | 3/2010 | Kokaji et al. | 180/68.5 |
| 2010/0089675 A1 * | 4/2010 | Nagata et al. | 180/68.5 |
| 2010/0114762 A1 | 5/2010 | Ishii | |
| 2012/0018238 A1 * | 1/2012 | Mizoguchi et al. | 180/68.5 |
| 2012/0055725 A1 * | 3/2012 | Mizoguchi et al. | 180/68.5 |
| 2012/0160583 A1 * | 6/2012 | Rawlinson | 180/68.5 |
| 2012/0175177 A1 * | 7/2012 | Lee et al. | 180/68.5 |

FOREIGN PATENT DOCUMENTS

| | | |
|---|---|---|
| DE | 19730678 A1 | 1/1999 |
| DE | 10020573 A1 | 10/2001 |
| DE | 10261630 A1 | 7/2004 |
| EP | 1479553 A2 | 11/2004 |
| JP | 5-208617 A | 8/1993 |
| WO | WO-2008/123543 A1 | 10/2008 |

OTHER PUBLICATIONS

"Italian Application Serial No. IT B020080760, Search Report dated Nov. 5, 2009", 2 pgs.

"Italian Application Serial No. IT B020090015, Search Report dated Sep. 21, 2009", 2 pgs.

* cited by examiner

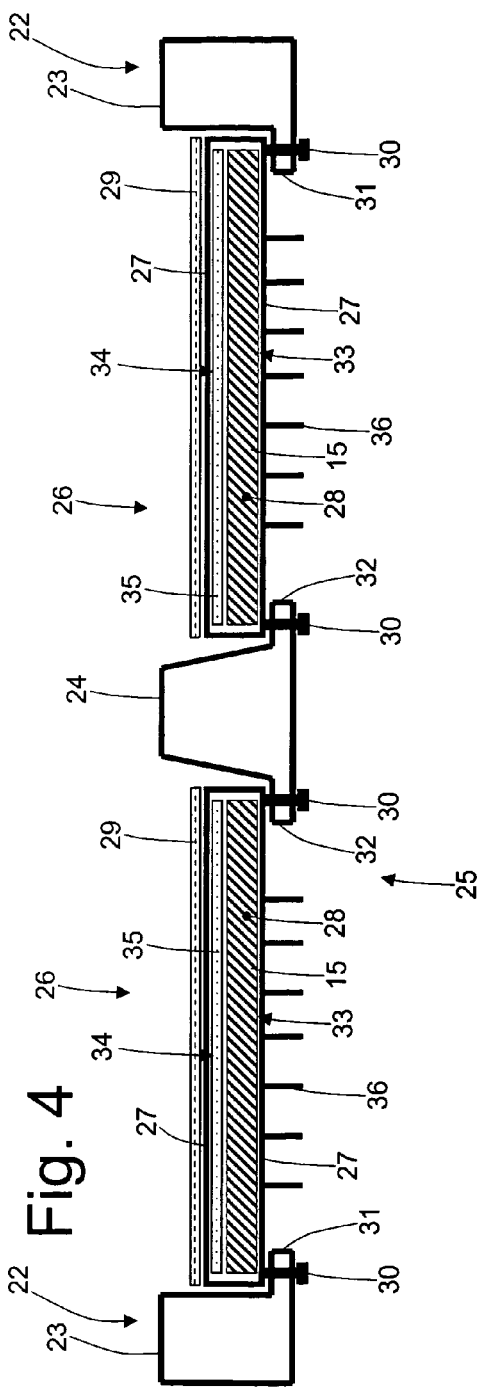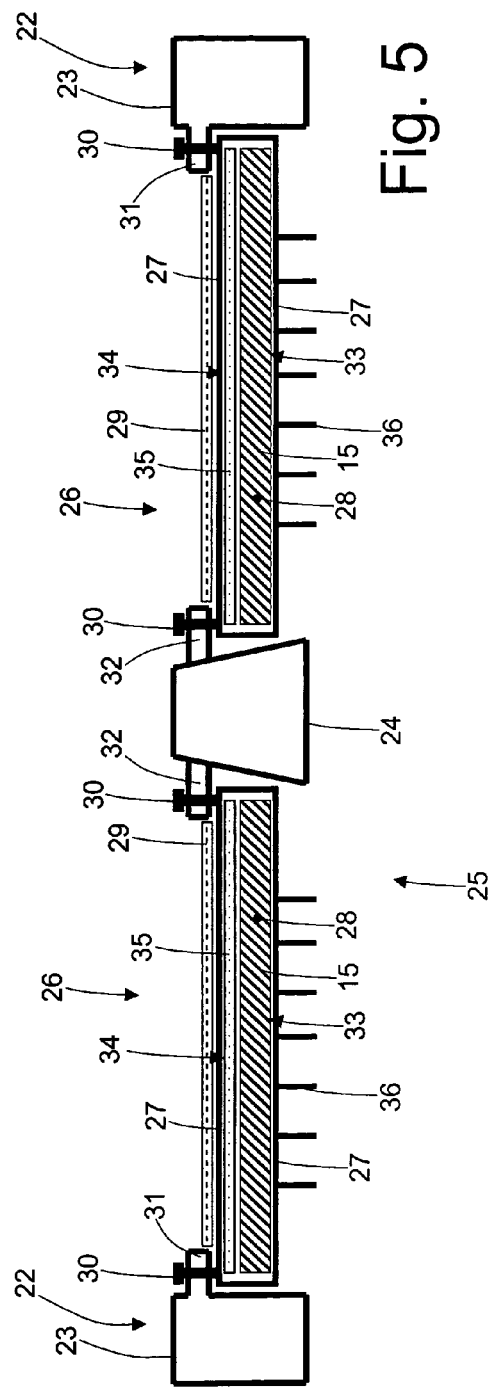

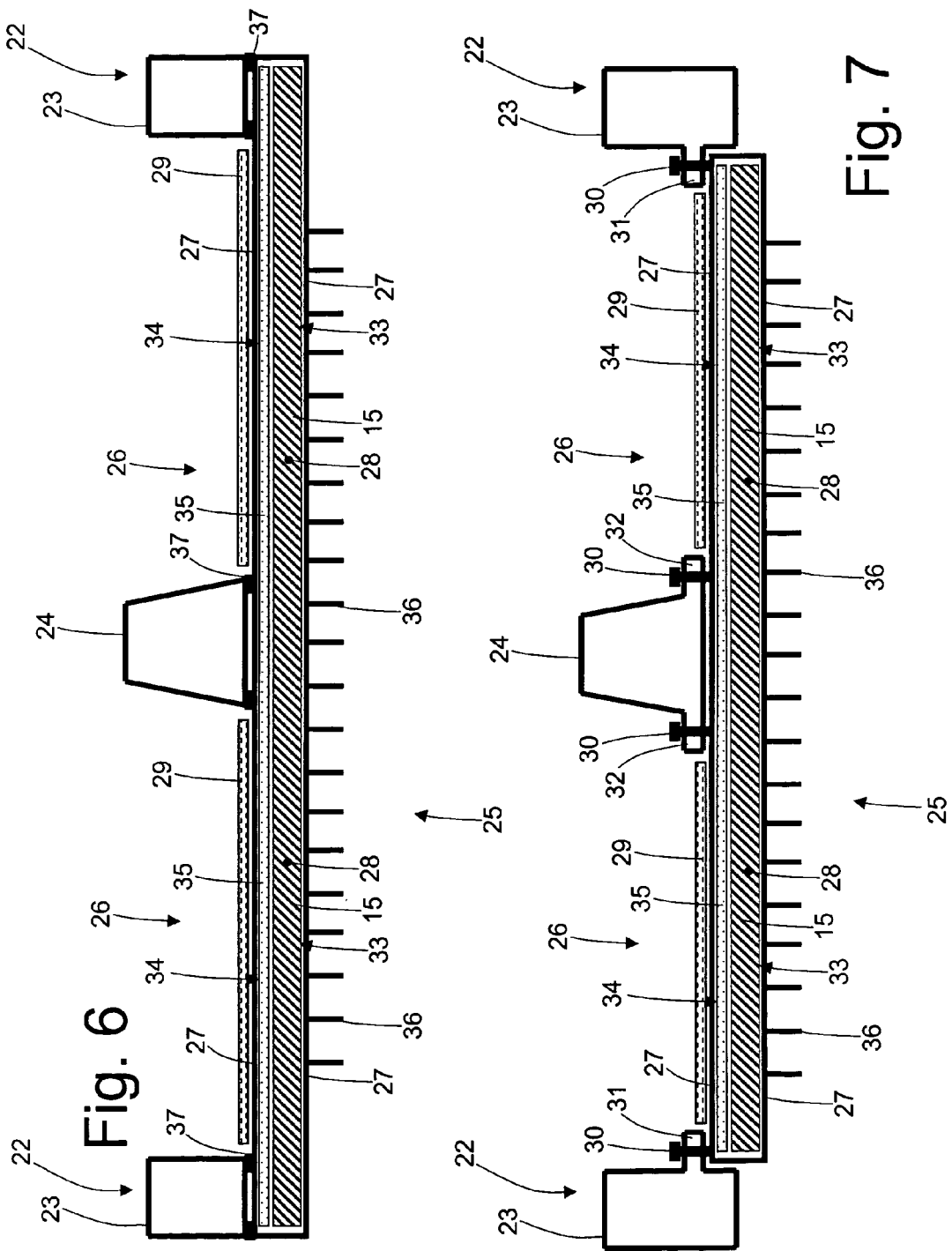

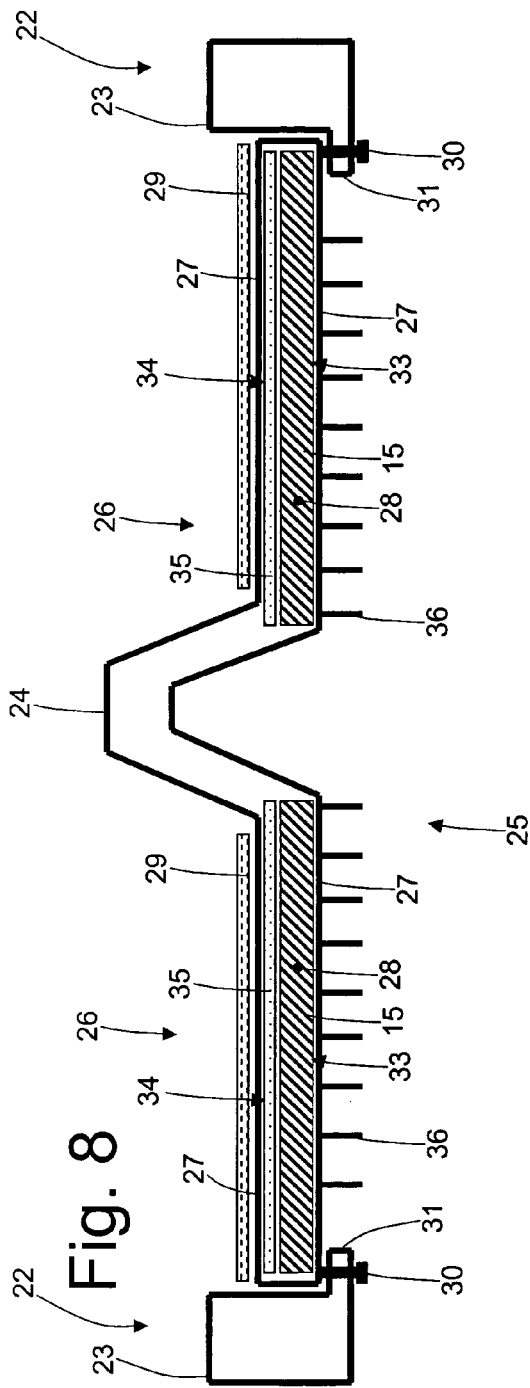
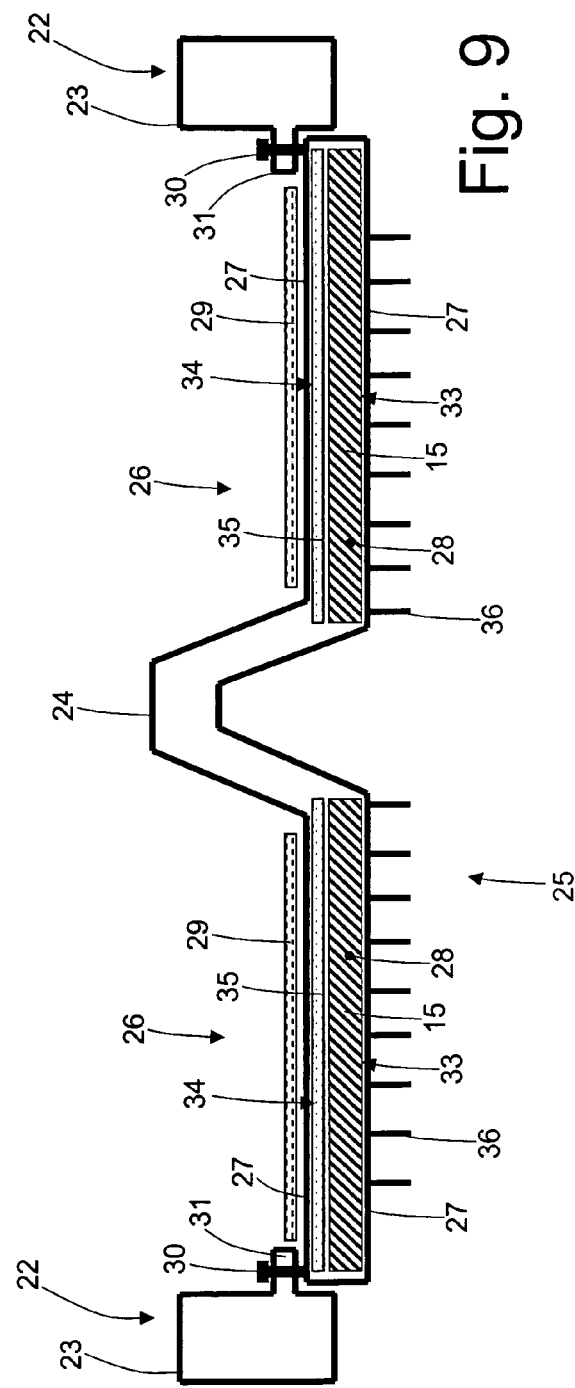

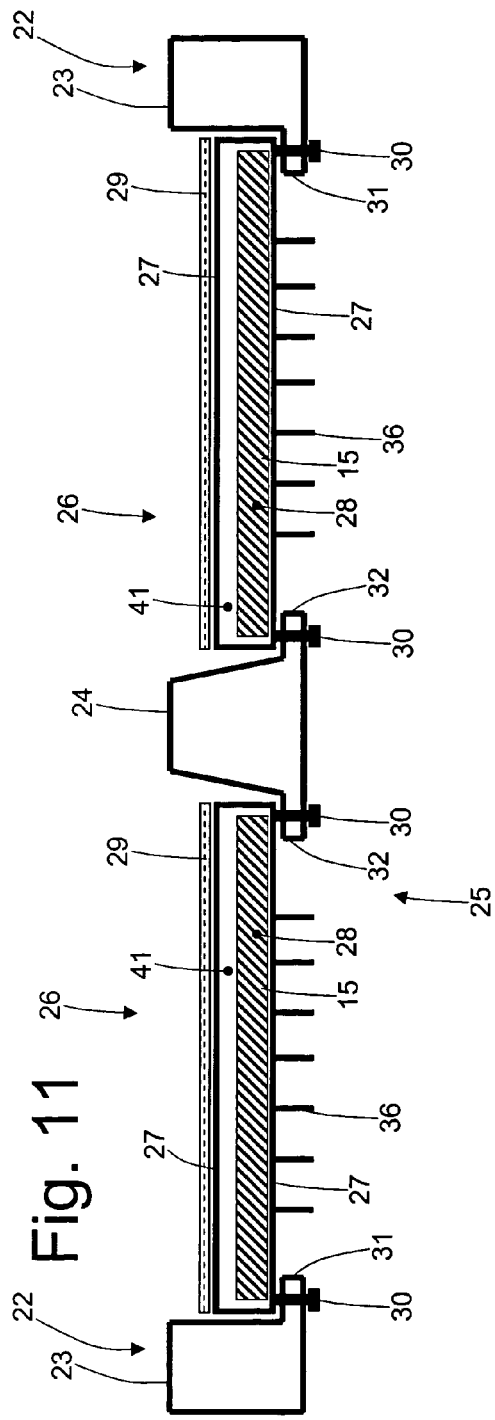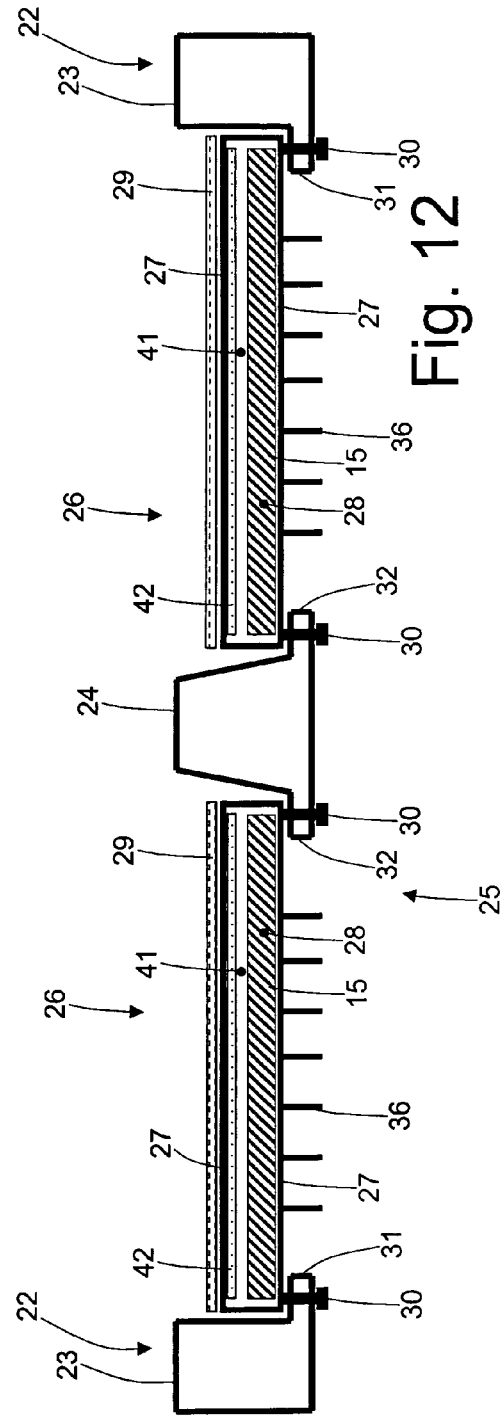

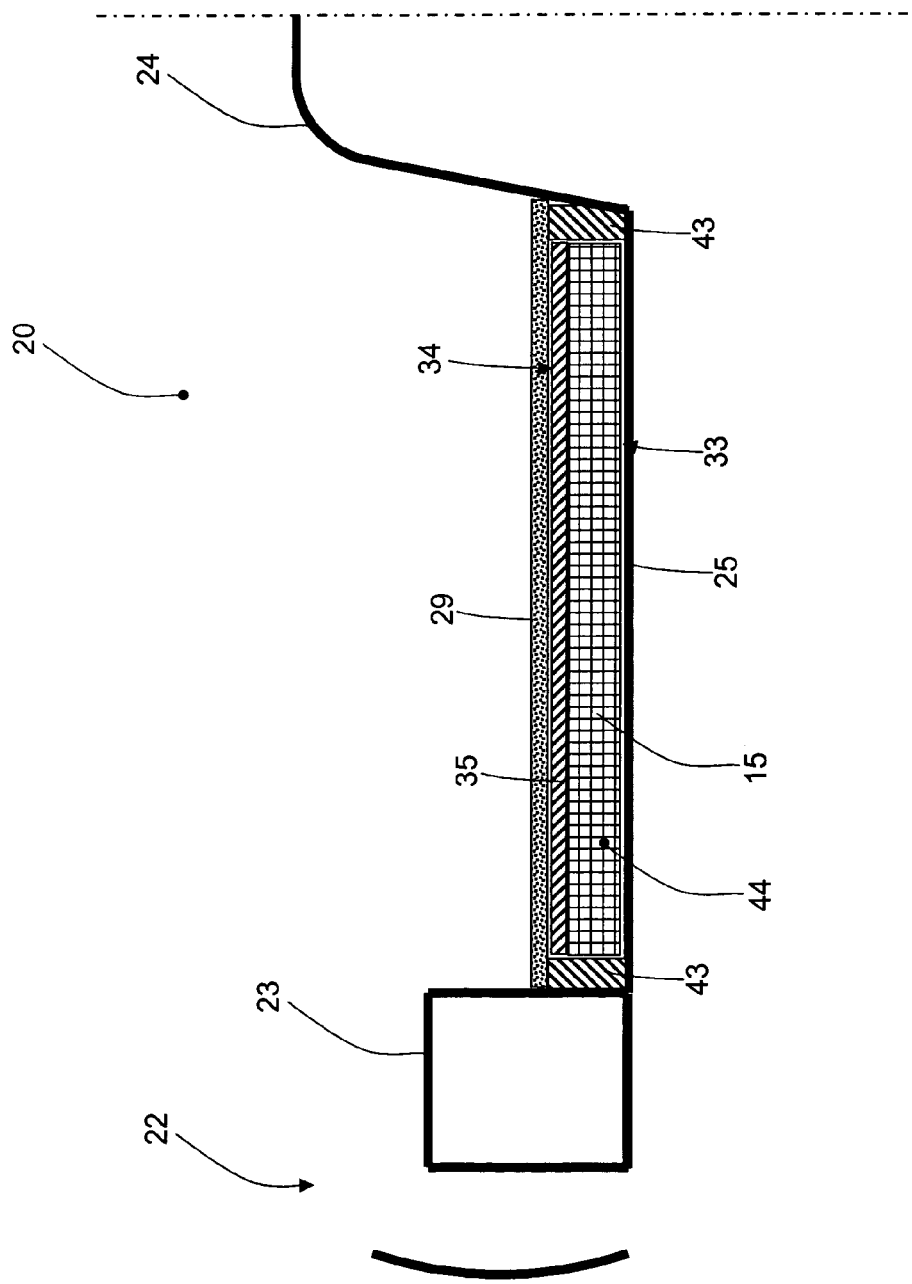

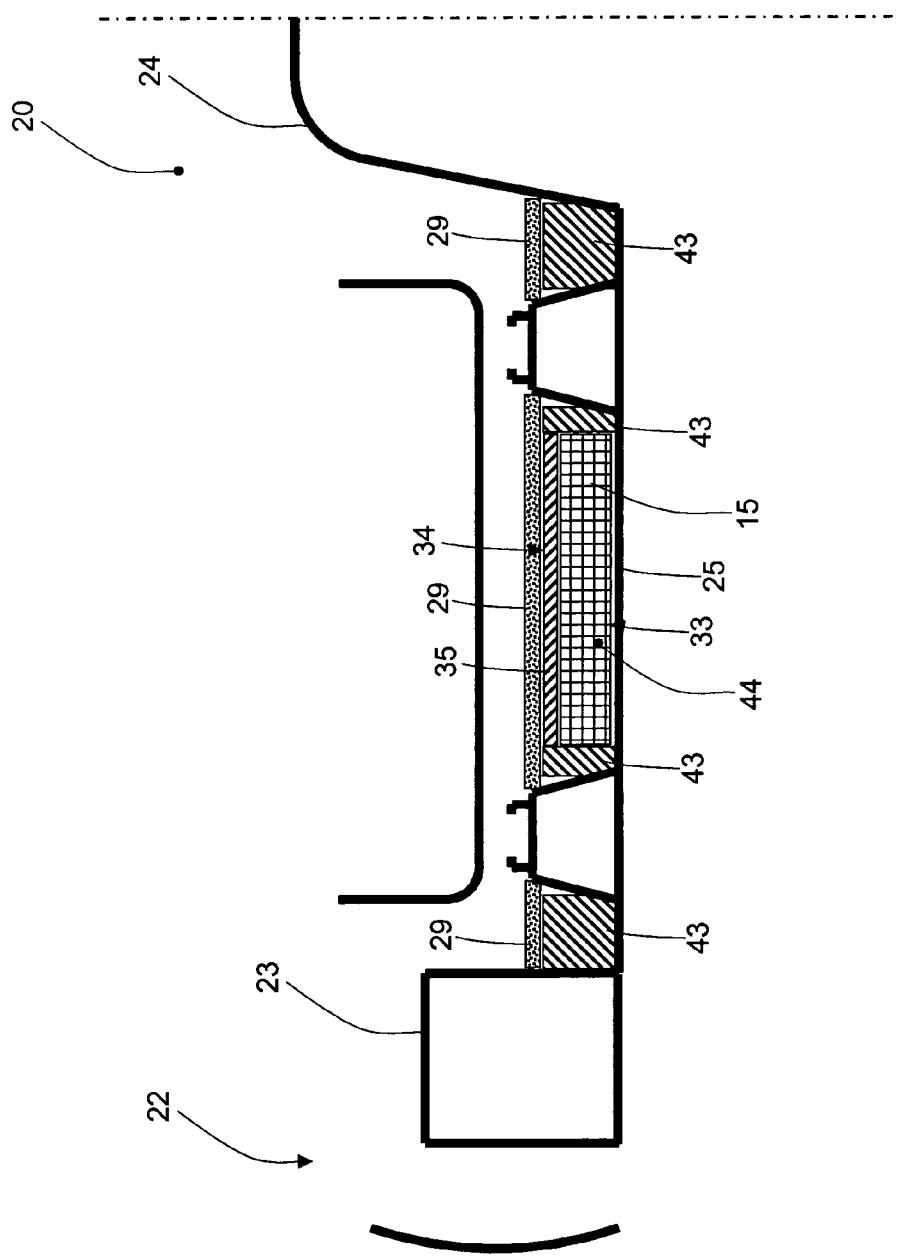

METHOD OF ARRANGING AN ELECTRIC ACCUMULATING SYSTEM CLOSE TO A PLATFORM OF A VEHICLE AND HYBRID PROPULSION VEHICLE

RELATED APPLICATION

This application claims the benefit of priority, under 35 U.S.C. Section 119, to Italian Patent Application Serial No. B02008A 000760, filed on Dec. 18, 2008 and Italian Patent Application Serial No. B02009 A000015, filed Jan. 16, 2009 which are incorporated herein by reference in their entirety.

TECHNICAL FIELD

The present invention relates to a method for arranging an electric accumulating device in proximity of a vehicle floor and a hybrid propulsion vehicle.

PRIOR ART

A hybrid vehicle comprises an internal combustion engine which transmits the driving torque to the driving wheels by means of a transmission provided with a gearbox, and at least one electric machine which is mechanically connected to the driving wheels. The electric machine is controlled by an electric drive connected to an electric accumulating system typically made of a pack of chemical batteries possibly connected in parallel to one or more super-capacitors.

While the vehicle is running, there are possible: a thermal operating mode, in which the driving torque is only generated by the combustion engine and possibly the electric machine acts as a generator for recharging the electric accumulating system; an electric operating mode, in which the combustion engine is switched off and the driving torque is only generated by the electric machine acting as an engine; or a combined operating mode, in which the driving torque is generated by both the combustion engine and the electric machine acting as an engine. Moreover, in order to increase the overall energy efficiency during all the steps of deceleration, the electric machine may be used as a generator for achieving a regenerative deceleration in which the kinetic energy of the vehicle is partially converted into electric power that is stored in the electric accumulating system instead of being completely dissipated in frictions.

The placement of the accumulating system within the vehicle may be very complex especially in the event of a high-performing sports vehicle having very reduced internal spaces. Specifically, the accumulating system must possibly be arranged in proximity of the electric machine and the electric drive for reducing the length of the connecting electric cables (thus reducing the weight of the electric cables and the power losses by Joule effect in the electric cables themselves), it must be arranged in a position protected from impacts as it is potentially subject to explode in case of very strong compression, it must be arranged in a position sheltered from the heat sources as it does not withstand high temperatures, it must be arranged in a vented position in order to have the possibility of venting the gas towards the external environment in case of failure, and it must be arranged so as not to unbalance the vehicle by means of its own considerable mass (in other words, as close as possible to the centre of gravity and to the ground in order to obtain a good dynamic behaviour of the vehicle).

In known vehicles, the above-mentioned constraints force the arrangement of the batteries of the accumulating system in not optimal positions, also severely limiting the useful space; consequently, the ability of storing electric power by the accumulating system is limited and thereby the chances of using the electric machine are also reduced.

U.S. Pat. No. 5,558,949A1 describes a boxed body, which is attached to the chassis of an electric traction vehicle and houses therein a set of batteries forming an electric accumulating device for powering a reversible electric machine mechanically connectable to the driving wheels of the vehicle.

US2005274556A1 describes a hybrid vehicle comprising a chassis that defines a housing, which is arranged in central position underneath the passenger compartment and houses an electric accumulating system.

DESCRIPTION OF THE INVENTION

It is the object of the present invention to provide a method for arranging an electric accumulating device in proximity of a vehicle floor and a hybrid propulsion vehicle, which are free from the above-described drawbacks and are both easy and cost-effective to be implemented.

According to the present invention, there are provided a method for arranging an electric accumulating device in proximity of a vehicle floor and a hybrid propulsion vehicle as claimed by the attached claims.

BRIEF DESCRIPTION OF THE DRAWINGS

The present invention will now be described with reference to the accompanying drawings, which illustrate some non-limiting exemplary embodiments thereof, in which:

FIG. 4 is a schematic cross-section with parts of a lower portion of the vehicle in FIG. 1 along the line IV-IV removed for clarity;

FIGS. 5-9 are schematic cross-sections with parts of some constructive variants of the lower portion in FIG. 4 removed for clarity;

FIG. 11 is a schematic cross-section with parts of a lower portion of the vehicle in FIG. 1 along the line XI-XI removed for clarity;

FIG. 12 is a schematic cross-section with parts of a constructive variant of the lower portion in FIG. 11 removed for clarity, and FIGS. 13 and 14 are corresponding schematic cross-sections with parts of a further variant of the vehicle in FIG. 1 removed for clarity.

PREFERRED EMBODIMENTS OF THE INVENTION

Figure 1:
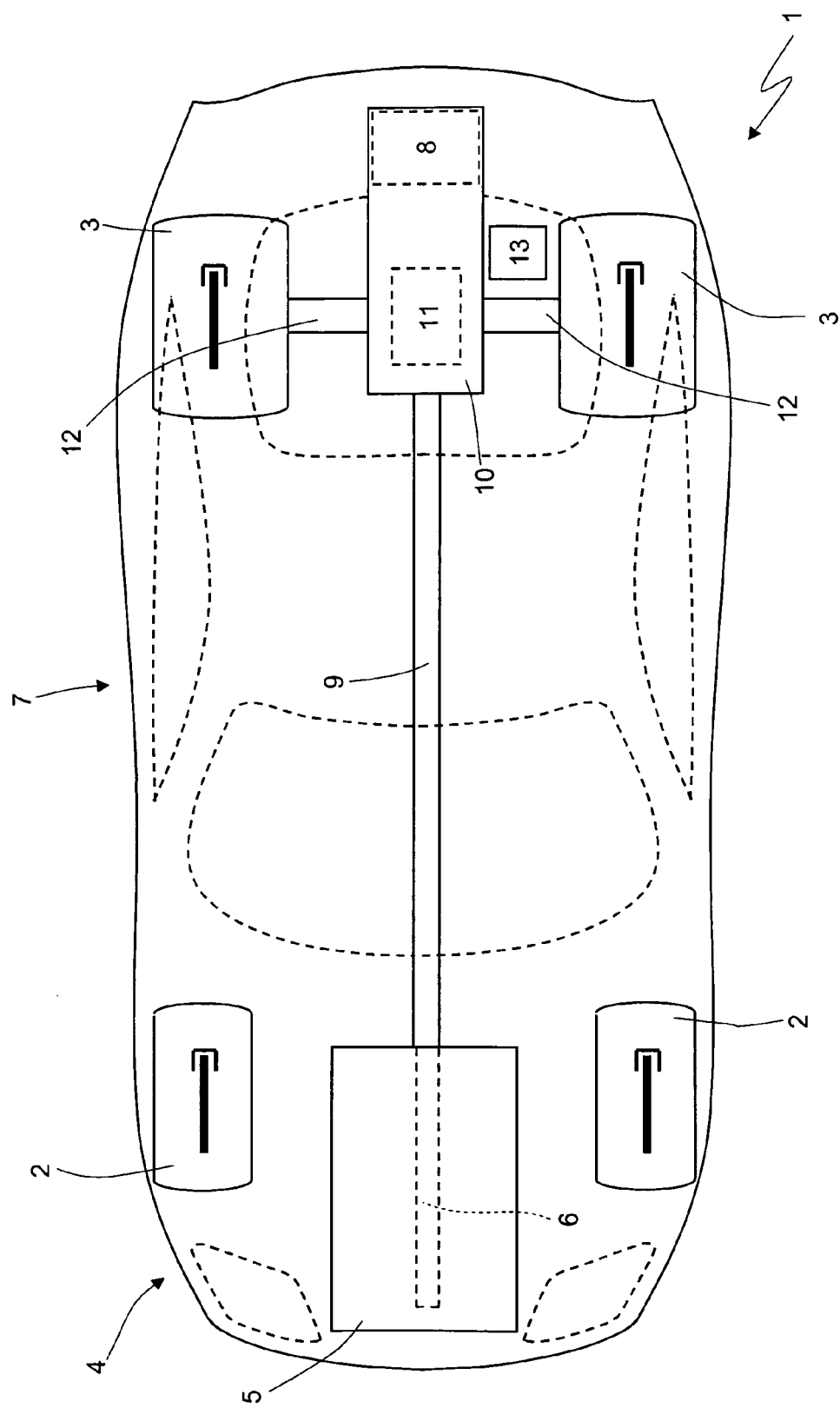
FIG. 1 is a schematic plan view with parts of a hybrid propulsion vehicle removed for clarity.

In FIG. 1, number 1 indicates as a whole a hybrid propulsion vehicle provided with two front wheels 2 and two rear driving wheels 3 which receive the driving torque from a hybrid engine power system 4.

The hybrid engine power system 4 comprises a thermal internal combustion engine 5, which is arranged in front position and is provided with a driving shaft 6, a power-operated transmission 7 transmitting the driving torque generated by the internal combustion engine 5 towards the rear driving wheels 3, and a reversible electric machine 8 (i.e. one that may act both as an electric engine by absorbing electric power and generating a mechanical driving torque, and as an electric generator by absorbing mechanical energy and generating electric power) that is mechanically connected to the power-operated transmission 7.

The power-operated transmission 7 comprises a transmission shaft 9 which is on one side angularly integral to the driving shaft 6 and on the other side is mechanically connected to a gearbox 10, which is arranged in rear position and transmits the motion to the rear driving wheels 3 by means of two axle shafts 12 which receive the motion from a differential 11. The reversible electric machine 8 is mechanically connected to the gearbox 10 and is controlled by an electric drive 13 connected to an accumulating system 14 (illustrated in FIG. 2), which is able to store electric power and comprises a set of accumulating devices 15, in turn comprising chemical batteries and/or super-capacitors.

Figure 2:
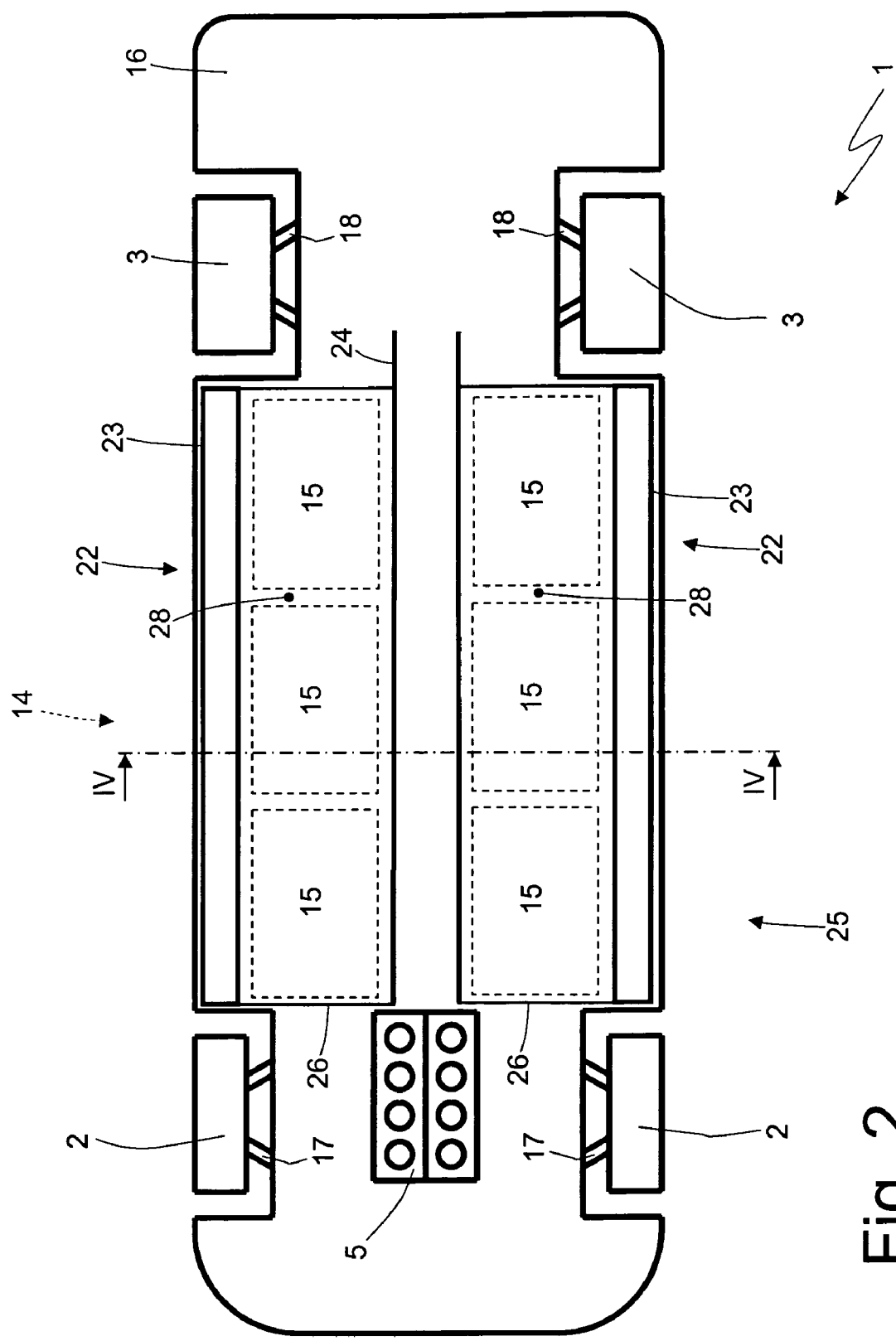
FIG. 2 is a further schematic plan view with parts of the vehicle in FIG. 1 removed for clarity.

As shown in FIG. 2, vehicle 1 is provided with a chassis 16 directly supporting the engine power system 4 and resting on the front wheels 2 and rear wheels 3 by means of the interposition of corresponding front suspensions 17 and corresponding rear suspensions 18.

Figure 3:
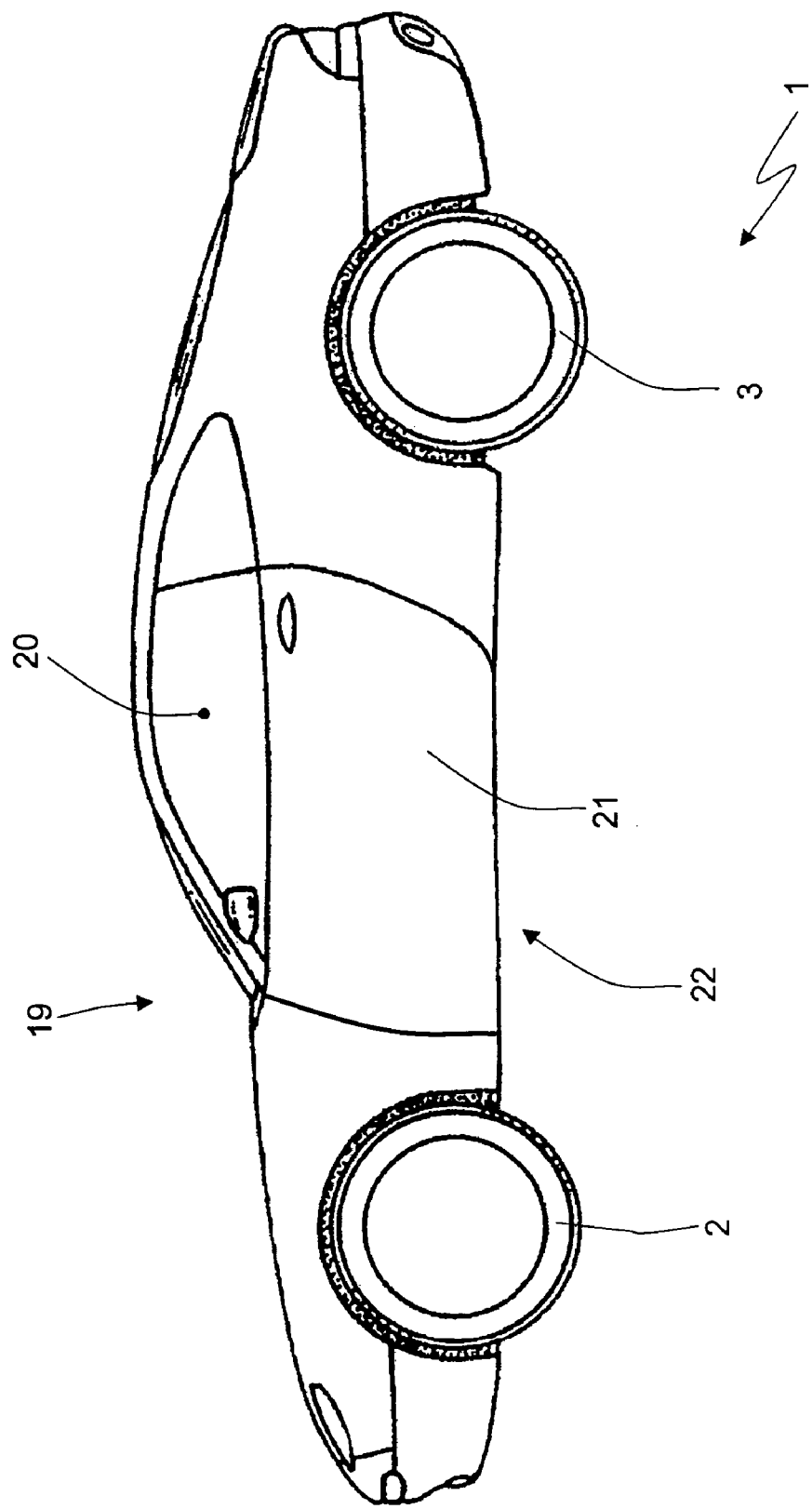
FIG. 3 a side and schematic view of the vehicle in FIGS. 1 and 2.

As shown in FIG. 3, the vehicle 1 comprises a bodywork 19 covering the chassis 16, defines a passenger compartment 20 and has at least two access doors 21 of the passenger compartment 20 itself. Under each door 21, a corresponding door sill 22 is defined (i.e. the underside of the door sill extending from the end of the front wheel arch to the beginning of the back wheel arch), in which there is arranged a longitudinal side member 23 (shown in FIGS. 2 and 4) of the chassis 16 which is therefore arranged at a side edge of the chassis 16 underneath a door 21.

As shown in FIGS. 2 and 4, the vehicle 1 comprises a central tunnel 24, which is attached to the chassis 16 for forming a structural part of the chassis 16, runs centrally and longitudinally from the thermal internal combustion engine 5 to the gearbox 10 and houses the transmission shaft 9. Moreover, the vehicle 1 comprises a floor 25 which is attached to the chassis 16 for forming a structural part of the chassis 16 itself and forms a bottom wall of the passenger compartment 20.

The floor 25 comprises two boxed bodies 26, each of which is preferably obtained through extrusion, it has a rectangular section tubular shape and comprises two horizontal base plates 27 reciprocally parallel and spaced, defining between them an internal seat 28; the accumulating devices 15 are housed in the internal seat 28 of each boxed body 26. Each boxed body 26 could also comprise one or more internal walls (not shown), which are arranged between the two plates 27 perpendicular to the plates 27 themselves for increasing the mechanical strength of the boxed body 26. A coating 29, which is a finishing of the passenger compartment 20 and specifically forms a visible paving of the passenger compartment 20, is resting over each boxed body 26. It is important to note that the function of the boxed bodies 26 is not only to contain the accumulating devices 15, but the boxed bodies 26 also have an important structural role, thus contributing to increase the overall stiffness of the chassis 16 in a non-negligible manner.

As shown in FIG. 2, the accumulating system 14 comprises six accumulating devices 15, which are symmetrically distributed within the two boxed bodies 26; of course, depending on the characteristics of the vehicle 1, the number and/or arrangement of the accumulating devices 15 may vary.

As shown in FIG. 4, each boxed body 26 is attached laterally with respect to a corresponding side member 23 and centrally with respect to the central tunnel 24 by means of a set of screws 30. According to the embodiment shown in FIG. 4, each side member 23 comprises a side bracket 31 overhangingly protruding from the side member 23 itself towards the central tunnel 24 and forms a support for the corresponding boxed body 26; moreover, the central tunnel 24 comprises a pair of central brackets 32, which are arranged on opposite sides of the central tunnel 24 and overhangingly protrude from the central tunnel 24 towards the side members 23 for forming a support for the boxed bodies 26. The screws 30 provide a rigid link between the brackets 31 and 32 and the boxed bodies 26.

According to a preferred embodiment, each accumulating device 15 has a parallelepiped shape and has a heating base wall 33, which is horizontal and free from heat insulation, and a non-heating base wall 34, being horizontal, is parallel and opposite to the heating base wall 33 and is provided with a heat-insulating material layer 35. According to a first embodiment, the non-heating base wall 34 is always facing upward for being in contact with the upper base plate 27 on which the coating 29 (and therefore the base plate 27 facing towards the passenger compartment 20) is resting, and the heating base wall 33 is always facing downward for being in contact with the lower base plate 27 delimiting the bottom of the vehicle 1 and which is therefore in contact with the external environment; in this way, the heat generated in use by each accumulating device 15 does not enter the passenger compartment 20 and is vented downward while being transmitted to the lower base plate 27, which delimitates the bottom of the vehicle 1 and is naturally cooled as it is constantly brushed by the air.

According to a different embodiment, each boxed body 26 is made with a symmetry allowing the reversal of the boxed body 26 itself in such a way that the heating base wall 33 may be equally arranged either upwards (i.e. towards the passenger compartment 20) or downwards (i.e. towards the external environment); in this way, depending on the season (summer or winter) it is possible to choose whether arranging the heating base wall 33 downwards for dispersing to the outside the heat generated in use by the accumulating device 15 (summer), or arranging the heating base wall 33 upwards for conveying the heat generated in use by the accumulating device 15 inside the passenger compartment 20 (winter). This embodiment providing the summer/winter reversibility of the boxed bodies 26 (and thereby of the accumulating devices 15) maximizes the energy efficiency of the accumulating devices 15 thus allowing, when useful, the recovery of the heat generated in use.

According to a possible embodiment, the two boxed bodies 26 being arranged on opposite sides of a longitudinal axis of the vehicle 1 (i.e. on opposite sides of the central tunnel 24) are made in such a way that it is necessary to make a right-left inversion of the boxed bodies 26 themselves in order to reverse the boxed bodies 26; in other words, the boxed body 26 arranged on the right must be moved to the left and vice versa. This embodiment is essential when the boxed bodies 26 do not have a rectangular base allowing a high symmetry, but have a trapezoidal base for following the shape of the chassis 16.

In order to allow the boxed bodies 26 to be disassembled and subsequently reassembled nothing, or at least the bare essentials, is attached to the boxed bodies 26. Specifically, the seats (not shown) of the vehicle 1 are not rested under the boxed bodies 26, but are laterally attached to the side members 23 and the central tunnel 24 and "float" over the boxed bodies 26; this constructive choice is especially easy when the front seats of the vehicle 1 are arranged in a fixed position while the pedals and a steering wheel (not shown) are mounted in adjustable position for suiting the height of the driver.

According to a possible embodiment, each boxed body 26 might comprise a set of vertical fins 36, which are arranged longitudinally (i.e. parallel to the travel direction of the vehicle 1) and overhangingly project downward from the lower base plate 27; the function of the fins 36 is to increase the heat exchange between the lower base plate 27 and the external environment by increasing the exchange surface and creating some channels between the fins 36 themselves in which the air is conveyed under the floor 25 for enhancing the overall aerodynamics of the vehicle 1 (for the latter function, the fins 36 might also be slightly tilted so as to define variable section channels). The fins 36 may be rigidly attached (e.g. welded) to the lower base plate 27 in the event the boxed bodies 26 are attached (i.e. non-removable) or may be removably attached (typically by means of screws) for being detached each time from the base plate 27 which must be arranged in higher position and re-assembled on the base plate 27, which must be arranged in lower position, when the boxed bodies 26 are reversed as described above.

The embodiment shown in FIG. 5 differs from the embodiment in FIG. 4 by the position of the brackets 31 and 32, which form a lower support in the embodiment in FIG. 4 and form an upper coupling point in the embodiment in FIG. 5. Consequently, in the embodiment in FIG. 4, the boxed bodies 26 must be inserted from above while in the embodiment in FIG. 5 the boxed bodies 26 must be inserted from below.

The embodiments shown in FIGS. 6 and 7 differ from the embodiment in FIG. 4 by the conformation of the floor 25 which provides for two boxed bodies 26 in the embodiment in FIG. 4 and a single double-wide boxed body 26 in the embodiments in FIGS. 6 and 7. Specifically, in the embodiment in FIG. 6, the boxed body 26 is welded to the side members 23 and the central tunnel 24 by means of welds 37 (therefore the boxed body 26 may not be disassembled), while in the embodiment in FIG. 6 the boxed body 26 is attached by means of the screws 30 (therefore the boxed body 26 may be disassembled).

The embodiments shown in FIGS. 8 and 9 differ from the embodiment in FIG. 4 by the conformation of the floor 25 which provides for two boxed bodies 26 in the embodiment in FIG. 4 and a single double-wide boxed body 26 in the embodiments in FIGS. 8 and 9. Specifically, in the embodiments in FIGS. 8 and 9, the boxed body 26 comprises the central tunnel 24 and is integral therewith; obviously, in these embodiments the boxed body 26 is not reversible (i.e. it is not possible to reverse the heating base wall 33 by the non-heating base wall 34) for a clear lack of symmetry.

Figure 10:
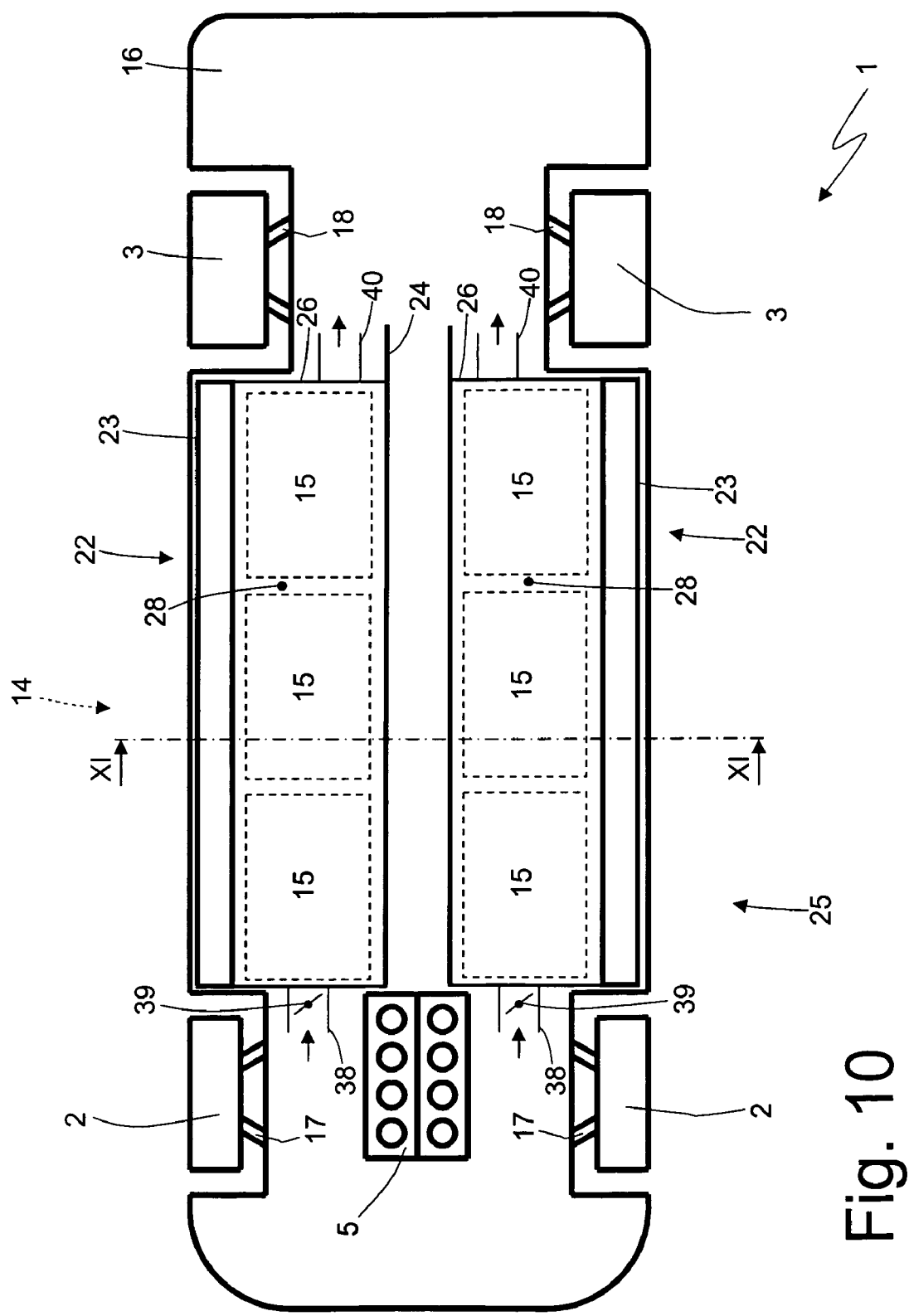
FIG. 10 is a schematic plan view with parts of a further variant of the vehicle in FIG. 1 removed for clarity.

According to the different embodiment shown in FIGS. 10 and 11, each boxed body 26 comprises an intake conduit 38, which is arranged in front position, it is controlled by a power-operated adjusting valve 39, and is adapted to convey a flow of air inside the boxed body 26 itself; moreover, each boxed body 26 comprises an outtake conduit 40, which is arranged in rear position and is adapted to extract a flow of air from the inside of the boxed body 26 itself. Within each boxed body 26, a cavity 41 is defined which runs from the intake conduit 38 to the outtake conduit 40 and is adapted to be crossed by a flow of air.

According to the embodiment shown in FIG. 11, within each boxed body 26, the function of the cavity 41 is to generate a heat insulation between the accumulating devices 15 and the upper base wall 27 so as to avoid that the heat generated in use by each accumulating device 15 is transmitted to the passenger compartment 20. Each intake conduit 38 originates from a dynamic air intake which is adapted to collect and convey the air when vehicle 1 is running, while each outtake conduit 40 terminates in an air vent towards the outside.

When the adjusting valves 39 are closed, there is no exchange of air within the boxed bodies 26, so that the heat generated in use by the accumulating device 15 vents only downward through the lower base wall 27 while the air between the accumulating devices 15 and the upper base wall 27 is gradually heated, thereby leading also to a gradual heating of the upper base wall 27 and therefore of the passenger compartment 20. Instead, when the adjusting valves 39 are open, there is a continuous exchange of air within the boxed bodies 26, so that the heat generated in use by the accumulating devices 15 vents both downwards through the lower base wall 27 and upwards through the flow of air; consequently, there is no heat transmission from the accumulating devices 15 to the upper base wall 27 and therefore to the passenger compartment 20.

As described above, by varying the position of the adjusting valves 39 it is possible to choose if the heat generated in use by the accumulating devices 15 must be partially directed towards the passenger compartment 20 (the adjusting valves 39 are closed) or fully vented towards the outside (the adjusting valves 39 are open). Moreover, in case of especially high external temperatures (i.e. in case of hot weather in the summer) due to the possibility of internally ventilating the boxed bodies 26, it is possible to avoid the excessive overheating of the accumulating devices 15.

In the variation shown in FIG. 12, there is provided an insulating material layer 42 arranged in contact with the upper base wall 27, so that in each case the heat generated in use by the accumulating device 15 is kept from being transmitted to the upper base wall 27 itself and therefore to the passenger compartment 20. In this case, the flow of air passing through the boxed bodies 26 and escaping from the outtake conduits 40 may be used, if required, for heating the passenger compartment 20 either directly (i.e. the air escaping from the outtake conduits 40 is taken in inside the passenger compartment 20) or indirectly (i.e. the heat of the air escaping from the outtake conduits 40 is delivered to an intermediate member which in turn heats the passenger compartment 20); such intermediate member may be e.g. an air-air heat exchanger heating the air within the passenger compartment 20 using the heat of the air escaping from the outtake conduits 40. In other words, the boxed bodies 26 are internally cooled by a flow of air which may be used, if required, for heating the passenger compartment 20 (possibly with a forced air circulation system such that the air escaping from the outtake conduits 40 is re-taken in by a fan in the intake conduits 38).

According to a further embodiment not shown, instead of using an air cooling system for the boxed bodies 26, a liquid (typically water) cooling system is used having a number of channels running within the boxed bodies 26 in contact with the accumulating devices 15; the heat removed from the liquid within the boxed bodies 26 may be vented outside, e.g. by means of a radiator, or may be used for heating the passenger compartment 20, e.g. by means of a water/air heat exchanger.

According to the alternative embodiment shown in FIGS. 13 and 14, each accumulating device 15 is not inserted within a corresponding boxed body 26, but is resting on the floor 25 under the coating 29 so as to be arranged between the floor 25 and the coating 29. For each accumulating device 15, there is provided at least one containment member 43 which is attached to the floor 25 and defines a seating 44, which reproduces in the negative the shape of the accumulating device 15 and is adapted to house therein the device accumulation 15 itself. It is a function of each containment member 43 to provide the accumulating device 15 with an appropriate mechanical support for giving the accumulating device 15 a stable position, thus preventing unwanted movements of the accumulating device 15 itself; it is a further function of each containment member 43 to fill the empty spaces around the accumulating device 15 so as to balance the level and provide the coating 26 with a uniform plan which is free from steps.

The above-described vehicle 1 has many advantages in that it is simple and cost-effective as it is structurally very similar to an analogue existing vehicle, and above all it offers an optimal positioning of the accumulating system 14 (i.e. the accumulating devices 15) from every aspect. First, the accumulating system 14 is highly protected against impacts, as it is arranged within the safety cell of the passenger compartment 20.

In the above-described vehicle 1, the accumulating devices 15 are arranged next to the central tunnel 24, therefore the connecting electrical cables between the accumulating device 15 and the electric drive 13 may run within the central tunnel 24 along a path free from bends, highly protected and relatively short.

In the vehicle 1, the accumulating system 14 is arranged in a position which is not subject to overheating and is easy to be cooled (as mentioned above, the lower plates 27 of the boxed bodies 26 are constantly washed from the air when the vehicle 1 is running).

Finally, in the vehicle 1, the accumulating system 14 is arranged very close to the centre of gravity and very close to the ground to avoid unbalancing the vehicle 1 because of its significant mass balance. Moreover, the above-described arrangement of the accumulating system 14 allows to considerably contain the height from the ground of the vehicle 1, which is therefore particularly low.

The invention claimed is:

1. A method for arranging an accumulating device (15) in proximity of a floor (25) of a vehicle (1) forming a bottom wall of a passenger compartment (20) of the vehicle (1) itself;
the accumulating device (15) has a heating base wall (33) which is free from heat insulation, and a non-heating base wall (34) which is parallel and opposite to the heating base wall (33) and is provided with a heat-insulating material layer (35); and
the method comprises the step of arranging the accumulating device (15) in a seating (44) obtained in proximity of the floor (25);
the method is characterized in that it comprises the further steps of:
implementing the accumulating device (15) with a symmetry allowing the reversal of the accumulating device (15) itself within the seating (44) obtained in proximity of the floor (25) such that the heating base wall (31) may be equally either faced upwards and then towards the passenger compartment (20) or faced downwards and then towards the external environment;
in the event of cold climate, arranging the accumulating device (15) in proximity of the floor (25), the heating base wall (33) facing upwards and then towards the passenger compartment (20) for transmitting the heat generated by the accumulating device (15) towards the passenger compartment (20) so as to heat the passenger compartment (20) itself; or alternatively
in the event of warm climate, arranging the accumulating device (15) in proximity of the floor (25), the heating base wall (33) facing downwards and then towards the external environment for dissipating the heat generated by the accumulating device (15) towards the external environment so as not to heat the passenger compartment (20).

2. A method according to claim 1, comprising the further step of reversing the accumulating device (15) within the seating (44) obtained in proximity of the floor (25) in case of climate change from cold to warm or vice versa.

3. A method according to claim 1, comprising the further step of choosing, according to the warm or cold weather, the arrangement of the heating base wall (33) downwards and then towards the external environment for dissipating the heat generated by the accumulating device (15) towards the external environment so as not to heat the passenger compartment (20), or the arrangement of the heating base wall (33) upwards and then towards the passenger compartment (20) for transmitting the heat generated by the accumulating device (15) towards the passenger compartment (20) so as to heat the passenger compartment (20) itself.

4. A method according to claim 1, wherein the vehicle (1) comprises at least two accumulating devices (15), which are arranged on opposite sides of a longitudinal axis of the vehicle (1) and are constructed in such a way that, in order to reverse the accumulating devices (15), it is necessary to achieve a right-left inversion of the accumulating devices (15) themselves.

5. A method according to claim 1, wherein the floor (25) of the vehicle (1) comprises at least one boxed body (26), which is attached to a chassis (16) of the vehicle (1), it has a rectangular section tubular shape, and comprises two horizontal base plates (27) reciprocally parallel and spaced which define between them an internal seating (28) in which the accumulating device (15) is housed.

6. A method according to claim 5, wherein the chassis (16) comprises a pair of longitudinal side members (23) arranged at the two side edges of the chassis (2); the boxed body (26) is laterally attached to the longitudinal side members (23).

7. A method according to claim 6 and comprising a central tunnel (24), which is attached to the chassis (16) for forming a structural part of the chassis (16) and runs centrally and longitudinally; the floor (25) comprises two boxed bodies (26) reciprocally separate and independent and arranged on opposite sides of the central tunnel (24); each boxed body (26) is centrally attached to the central tunnel (24) and laterally to the longitudinal side members (23).

8. A method according to claim 5, wherein the boxed body (26) comprises:
an intake conduit (38) capable of conveying a flow of air within the boxed body (26);
an outtake conduit (40) capable of extracting a flow of air from within the boxed body (26);
a cavity (41), which is defined within the boxed body (26), runs from the intake conduit (38) to the outtake conduit (40), and is adapted to be crossed by a flow of air; and
an adjusting valve (39) for adjusting the flow of air from the intake conduit (38) to the outtake conduit (40) through the cavity (41).

9. A method according to claim 8, wherein the intake conduit (38) originates from a dynamic air intake which is adapted to collect and convey the air when the vehicle (1) is running, and the outtake conduit (40) terminates in an air vent towards the outside.

10. A method according to claim 8, wherein the flow of air crossing the cavity (41) of the boxed body (26) may be used for heating the passenger compartment (20).

11. A method according to claim 5, wherein the boxed body (26) comprises a cooling liquid system having a number of channels running within the boxed body (26) in contact with the accumulating device (15); the heat removed from the liquid within the boxed body (26) may be vented outside or it may be used for heating the passenger compartment (20).

12. A method according to claim 1, wherein the accumulating device (15) is resting on the floor (25).

13. A method according to claim 12, wherein there is provided a coating (29) which is arranged over the floor (25) and forms a finishing of the passenger compartment (20); the accumulating device (15) is resting on the floor (25) under the coating (29) so as to be arranged between the floor (25) and the coating (29).

14. A method according to claim 12 and comprising at least one containment member (43) which is attached to the floor (25) and defines the seating (44), which reproduces in the negative the shape of the accumulating device (15) and is adapted to house the accumulating device (15) therein.

* * * * *